Feb. 13, 1962 L. R. MAXWELL 3,020,753
DYNAMOMETER
Filed Nov. 5, 1956 4 Sheets-Sheet 1

INVENTOR:
LLOYD R. MAXWELL
BY Howson & Howson
ATTYS.

Feb. 13, 1962 L. R. MAXWELL 3,020,753
DYNAMOMETER
Filed Nov. 5, 1956 4 Sheets-Sheet 2

INVENTOR:
LLOYD R. MAXWELL
BY
Howson & Howson
ATTYS.

Feb. 13, 1962 L. R. MAXWELL 3,020,753
DYNAMOMETER
Filed Nov. 5, 1956 4 Sheets-Sheet 4

INVENTOR:
LLOYD R. MAXWELL
BY Howson & Howson
ATTYS.

United States Patent Office 3,020,753
Patented Feb. 13, 1962

3,020,753
DYNAMOMETER
Lloyd R. Maxwell, Bradford Hills, Downingtown, Pa.
Filed Nov. 5, 1956, Ser. No. 620,472
19 Claims. (Cl. 73—117)

This invention relates to a dynamometer device which measures power without using a machine having a rotatably mounted field to measure torque. More specifically this invention relates to a dynamometer in which a great variety of mechanical loads or power absorbing devices of known speed-power characteristics may be used as the test load device of the dynamometer and power of a device of unknown characteristics being tested can be known merely by determining rotational speed. This invention further relates to a simplified dynamometer of this type in which the mechanical load, which in some instances may serve alternatively as a power supply, is not used as the measuring device but is merely a load or power supply, the measuring of power being done solely from speed using speed responsive devices. Consequently, no complex compensating circuitry or equipment is required in association with this dynamometer device, a simple means of balancing out error producing effects in power readings being used. The method of accomplishing these ends as well as apparatus for doing it is the subject of this invention.

It is frequently desirable to ascertain the speed-power characteristics and capabilities of various types of machinery and particularly machinery which has its own prime mover. Sometimes it is desirable to ascertain the characteristics of the prime mover itself as well as in combination with the rest of the machinery. Heretofore, conventional electrical and hydraulic dynamometers have been used extensively for dynamically testing machinery in order to ascertain its power characteristics and capabilities. All such dynamometers heretofore have been charaacterized by a rotatable mounting for the relatively fixed portion of the machine as well as for the normally movable part, the rotation of the fixed portion being prevented or limited by a torque arm and the force at this torque arm is the applied torque. From the torque-speed determinations calculations of power for that particular load can be plotted against speed. Dynamometers can act either to absorb or supply power and hence have great flexibility as testing devices. However, many types of dynamometers capable only of absorbing power, such as certain hydraulic dynamometers, also operate on the same general principles.

In accordance with the present invention no rotatable field is required and no torque arm or torque measuring device need be supplied. As a consequence the apparatus of the present invention can be materally simpler and use conventional, less expensive machines as mechanical loads. Moreover, expensive torque measuring devices are completely eliminated and instead relatively simple speed measuring apparatus and, in preferred forms of the invention, relatively simple and inexpensive compensation devices are substituted.

In its simplest form the dynamometer of the present invention comprises a mechanical load device of known speed-power characteristics, which in some instances may also provide a power generator, and means for coupling the mechanical load device to the device to be tested. A rotational speed recording device is coupled to the device to measure power in terms of the speed-power characteristics of the load which for a given mechanical rotational load will always be the same.

Among other problems encountered in testing devices of the prior art are those associated with general accuracy of the power measurement readings. Inaccuracies creep into the readings by way of a great variety of variables such as mechanical friction of moving parts and other effects which may vary from one test to another. As a consequence of these variables, it has been necessary to correct readings in one of two ways to wit: by corerction equipment to compensate for the effects of these variables on the power readings or by making elaborate calculations in order to correct readings which are obtained taking into account the various factors producing inaccuracies. Neither of these means is entirely satisfactory from an accuracy standpoint and both are relatively expensive expedients. The correction of measurement readings from the test loading device itself is initially expensive because for good accuracy relatively complex circuits or equipment is required. On the other hand, correction of the readings obtained by mathematical means is tedious and time consuming. Moreover, the accuracy of results by either of these expedients is never certain because of the unpredictable nature of some variables such as loading effects due to different viscosities of grease, etc.

The present invention eliminates the difficulties encountered heertofore in obtaining commercially satisfactory and accurate readings. It eliminates the need for compensation applied to the test loading device. It fact, it eliminates the use of the test loading device as a measurement instrument. Rather than using the test loading device as the power measurement means in accordance with the present invention the test loading device is used only as a loading device to absorb or absorb and generate power, and the reading is taken directly off the shaft, preferably adjacent to the device to be tested by a speed responsive, speed indicating device, such as tachometers.

According to the present invention, it is merely necessary to know the speed-power characteristics of the test load device of the dynamometer to calibrate the speed indicator directly in terms of power. Because of the simple nature of this power recording expedient, it is equally simple to compensate for the errors due to mechanical friction, viscosity of greases, etc. This is done by using in preferred apparatus an adjustable reference force of like nature to the force produced by the speed applied indicator to algebraically add to the force representing speed or power. By attaching a prime mover to the dynamometer and driving it at the normal no load speed of operation, it is possible to adjust the reference force to balance out the other force to zero. This balancing by a very simple expedient eliminates all fixed error from the power readings and makes possible a record of the effect of the known load on a device to be tested without regard to the internal incidental loading. Moreover, the simple adjustment required to compensate such error effects is accomplished by a simple adjustment of the power reading to zero when the speed is that which should produce no load.

For a better understanding of the present invention, reference is made to the following drawings.

Figure 1:
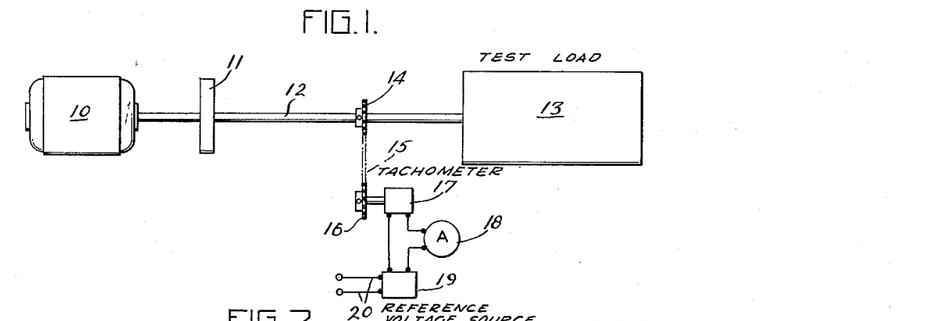
FIG. 1 is a schematic diagram illustrating a dynamometer of the present invention in its simplest form.

Referring first to FIG. 1, the dynamometer schematically represented without support structure is intended to represent a test load device 10 and associated flywheel 11 having a shaft 12 connected to a device 13 to be tested. Mounted on shaft 12 is a sprocket drive 14 which through a chain 15 drives a sprocket 16 on the shaft of tachometer generator 17. Tachometer 17 is connected to an ammeter 18 which, in turn, is connected to a reference voltage source 19 which is also directly connected to one terminal of tachometer 17, or, alternatively, connected through ground to the tachometer and supplied power through lines 20.

Unlike dynamometers of the prior art, it will be observed that the test load device 10 is not mounted to be rotatable about the same axis as its armature. In fact, this test load device is securely fastened to support structure (not shown here) as will hereafter appear in connection with an embodiment for testing automotive power. Although it does not appear from the diagram, it will also be noted that the only lines to the test load device 10 will be power supply connections, all readings being taken from the speed indicating device or tachometer as will hereafter appear.

In operation, the dynamometer or the structure without device 13 has known characteristics of speed versus horsepower or speed versus torque, and if only one of these characteristics is known, the other can be computed by the formula:

$$\text{power} = \frac{\text{torque} \times \text{speed}}{\text{constant}}$$

When the machine or device to be tested is connected to the shaft 12, it must rotate in synchronism with the dynamometer whether it drives the dynamometer or the dynamometer drives it.

The dynamometer test load device 10 in its simplest form is merely a load capable only of absorbing power and incapable of generating power and driving the device to be tested. The characteristics of such a power absorbing load dynamometer, in effect, tell how much power is required to drive it at a particular speed. Therefore, when the device to be tested 13 drives the dynamometer, if the speed is known, the amount of power exerted by the test device will be known. An example of such a simple load is a hydraulic load wherein a rotor is driven against fluid resistance.

In a more complex form, the dynamometer test device is capable both of absorbing power and generating and delivering power to the load. Typical of such a test load is a squirrel cage induction motor. Such a motor may have a no load speed of 3600 r.p.m. If it serves as a power absorbing load, the faster it is driven above 3600 r.p.m., the more power required to drive it, i.e. the more power it will absorb. In this guise, it may be used to measure the power supplying capabilities of the device to be tested. If it serves as a power generating source, however, it will, in effect, drive the device to be tested and the more power required to do this driving, the slower it will rotate in accordance with the speed-power characteristic of the dynamometer.

In a dynamometer system which is not ideal there are mechanical frictional effects and other error producing effects which require a certain amount of power to be expended in overcoming them. Moreover, these effects may vary from time to time. Therefore, if accurate power readings for the device to be tested are to be had, these error producing effects must be cancelled or balanced out in some way. In conventional dynamometers this has to be done by complex compensation of the test load device itself which may take a variety of forms but which often has to be elaborate in order to avoid affecting the characteristics of the device, particularly since, for good accuracy, readjustments require taking into consideration such differences in mechanical friction, for example, as may be caused by differences in grease, viscosity, etc. In accordance with the present invention, however, accurate readings may be obtained and necessary compensation quickly and easily accomplished by observation using a simple adjustment without making measurements and extensive calculation and without regard to the exact nature of the effects which produce inaccuracies.

The nature of the speed indicating device may vary widely within the scope of this invention. The speed indicating device shown in all of the drawings is a tachometer generator which produces a linear voltage proportional to speed which voltage may be easily read on a galvanometer. However, a variety of mechanical tachometers or other speed indicators may be used in place of a tachometer generator. However, whatever type of speed indicator is used, it is preferred that it produce a force to indicate speed and hence power which may be easily duplicated. This will facilitate the balancing out of mechanical frictional and other similar effects which remove the operation of the test load device from the ideal non-friction category. Such balancing can then be accomplished by attaching a prime mover to the dynamometer and driving it under no load conditions. Then by applying neutralizing forces to add algebraically to the force on the speed indicator until the indicator reading shows zero power, all error producing effects are neutralized without regard to their cause and without knowing their actual magnitude.

Considering specifically the tachometer generator, it can be one of a type which generates a linear output of voltage proportional to the speed of rotation of the shaft of the tachometer. Therefore, by positively connecting the shaft of the tachometer to the shaft 12 of the testing system, the output of the tachometer 17 is a true representation of the speed of the system. The speed of shaft 12, if not the actual speed of the dynamometer 10 in every case is proportional to it, and, therefore, since the speed-power characteristics of the dynamometer are known, it is possible to calibrate a meter recording the output o fthe tachometer directly in terms of power in accordance with the speed power characteristics of the dynamometer. A meter reading speed may be a voltmeter or an ammeter, depending upon the particular arrangement of the circuit. However, without compensation for the inaccuracies of the system, such as its inherent mechanical fractional resistance to movement, these readings will not be accurate. As a consequence, at no load, a meter calibrated with no load at its proper theoretical speed will read as though power were being delivered to a load because of the friction and other loading effects of the dynamometer. It is possible to balance out this no load condition in accordance with the present invention, however, by using a reference voltage source 19 to produce a voltage equal to that producing deviation from a zero power reading and apply it to the tachometer to add algebraically and to compensate for the amount of voltage inherent self-loading of the dynamometer so that the meter 18 will read zero, i.e., no power absorbed and no power delivered. Then, upon loading, by connection of the device to be tested to the dynamometer, the meter 18 will read correctly in accordance with its calibration to show power absorbed by the dynamometer or generated by the dynamometer and supplied to the device 13 to be tested. It will thus be observed that corrections which have heretofore been difficult are easily accomplished simply by the adjustment of the voltage output of reference voltage source 19. This is done without calculation, it simply being necessary to accomplish the balancing out of friction and other loading effects which contribute to errors in the load testing of the device to be tested.

Figure 2:
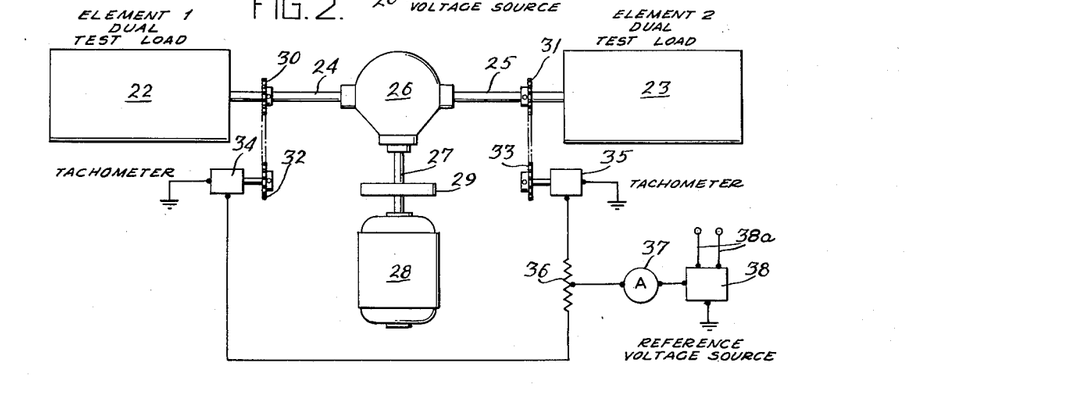
FIG. 2 is a schematic diagram illustrating a more complex dynamometer suitable for chassis dynamometry.

Very often it is necessary to apply a modified form of the system of FIG. 1 to a device to be tested such as an automobile in which power is delivered through more than one shaft, in which case the power delivered through each shaft must be considered. Usually what is desired in such a case is a determination of mean power. FIG. 2 shows two elements of such a device to be tested, represented by boxes 22 and 23. Each of these elements is coupled to a shaft 24 and 25, respectively, and these terminate in a differential 26, which, in turn, is connected through shaft 27 to a test load device 28, which may be an induction motor as previously described. A flywheel 29 is also preferably employed on this shaft. Sprocket drives 30 and 31 are placed on shafts 24 and 25, respectively, and drive sprockets 32 and 33 on tachometer generators 34 and 35, respectively. In this case, the generators are shown grounded and a single lead is connected from each generator to the opposite ends of voltage divider 36. A midtap on the voltage divider is connected by a common ammeter connection to ammeter 37 which, in turn, is serially connected to adjustable reference voltage source 38. Voltage source 38 completes the circuit back to tachometers 34 and 35 through its connection to ground. The voltage source itself may be supplied power through leads 38a.

Boxes 22 and 23 may represent compositely an automobile to be tested and specifically the coupling to the two rear wheels of that automobile through drums which are part of the dynamometer system and on which the wheels rest and through which they impart rotational torque to shafts 24 and 25. The effect of the use of the differential 26 is to permit the separate loading of each wheel to have its own separate effect on the shafts 24 and 25 but to produce a mean effect on the dynamometer 28.

Figure 3:
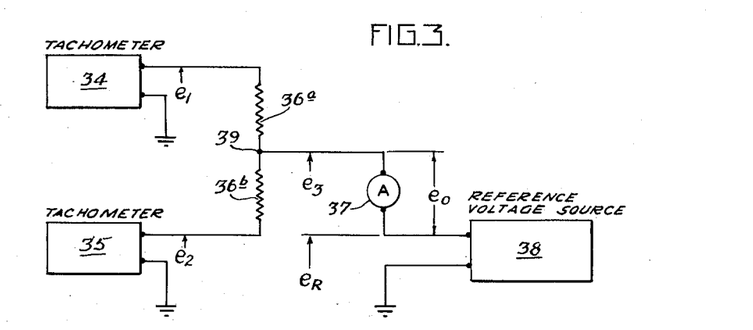
FIG. 3 shows in more detail the mean power indicating circuit diagram employing separate tachometers in connection with each drive shaft of FIG. 2.

The meter circuit of FIG. 2 is shown in FIG. 3 wherein it will be observed that tachometer 34 produces a D.C. voltage $e_1$ above ground and tachometer 35 produces a D.C. voltage $e_2$ above ground. Voltage divider resistance 36 is preferably a pair of resistances 36a and 36b of the same size, then because of the voltage divider effect of resistances 36a and 36b voltage $e_3$ is a mean or average of voltages $e_1$ and $e_2$. For an ideal frictionless dynamometer, voltage $e_3$ would produce a certain current through the ammeter which would represent the mean power of the device to be tested since the meter is calibrated in terms of mean power developed at or demanded by power sources 22 and 23. In a practical system, however, error will occur due to mechanical frictional effects or other effects which will appear as power expanded by the device to be tested unless balanced out. This error can be compensated by reference voltage $e_r$ from reference voltage source 38 in accordance with the technique briefly and generally described above. When the system is running at no load, $e_r$ is adjusted until $e_0$, the reading of the meter 37 is zero. The meter is calibrated in terms of power with no load speed producing zero power. Thereafter, the meter 37 will read in true power generated or absorbed by the device to be tested.

It will again be observed that in accordance with the system of the present invention, the dynamometer or other power absorbing and/or generating means is merely a workhorse or loading device and plays no part in the actual measurement, contrary to its function in devices of the prior art. In acocrdance with the present invention, all measurements of whatever type can be taken from the tachometer or tachometers as will be explained hereafter.

Figure 4:
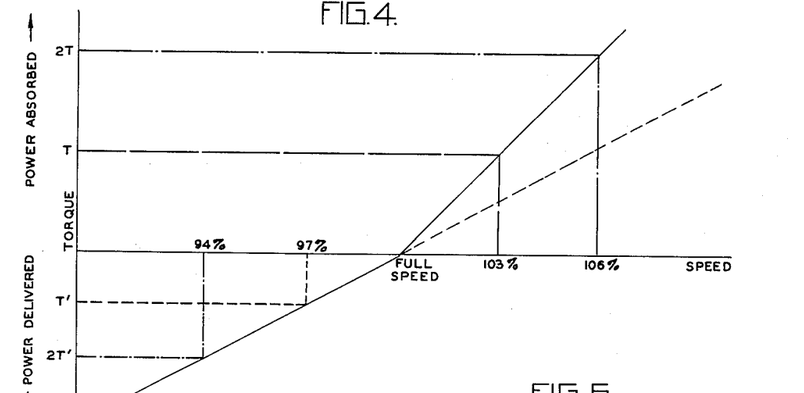
FIG. 4 is a speed-power or "load" curve showing the nature of power absorbed or delivered by a fixed test load at certain speeds.

It is usually desirable to use as a test load device a machine which can both absorb and generate power. A highly satisfactory and versatile load of this sort is the squirrel cage induction motor. However, such a device presents certain difficulties. In particular as seen in FIG. 4, wherein is shown a typical speed-power (or speed-torque) characteristic of a typical induction motor, this characteristic is not a continuous straight line. Under usual circumstances, it is made up of two segments each of which is a straight line lying on one side of the no load full-speed torque, zero power line and intersecting at that line. Therefore, in order for the same meter calibration to serve throughout the whole operating range of the device, it is necessary to introduce some compensation. This is simply done in accordance with the present invention by the use of a modified circuit such as that shown in FIG. 5.

Figure 5:
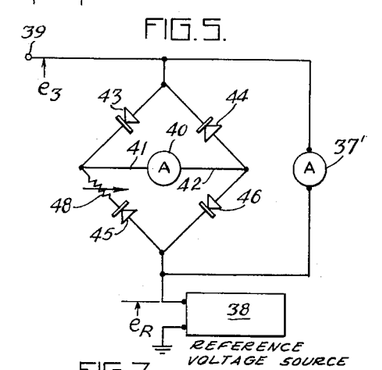
FIG. 5 is a schematic circuit diagram showing correction means for securing the alignment of all parts of the "load" curve shown in FIG. 4.

In FIG. 5, the circuitry is the same as that shown in FIG. 3 from the tachometers 34 and 35 to the terminal 39 at which the voltage $e_3$ appears. The circuit between terminal 39 and the reference voltage supply 38 is modified, however, in a way which effectively shifts the part of characteristic above zero power to the position shown as a dashed line so that the effective characteristics become a continuous straight line. The meter 37' is not compensated and hence reads just as the center zero reading meter of FIG. 3, but in this instance it is left uncalibrated and provided with some designation on the face of the meter indicating whether power is being delivered or being absorbed. At no load, the dial of the meter will read at its zero position in the center of its scale. Under conditions of power absorption, it will read to one side of the center in a section that may, for example, be marked red; whereas under power delivered conditions it will read on the other side of the zero point in an area that may, for example, be marked in green color. Hence it functions simply to tell at a glance whether power is being delivered or absorbed by the dynamometer. Power is read on a separate meter 40. Meter 40 has two paths from terminal 39, one connected to its terminal lead 41 on one side of the meter and the other connected to its terminal lead 42 on the other side of the meter. The lead connected to terminal lead 41 contains a rectifier 43 which permits flow of current only in a direction from terminal 39 to the meter 40. The lead connected to terminal lead 42, on the other hand, permits flow of current only from terminal lead 42 to the terminal 39 as a result of the orientation of rectifier 44. Similarly, the reference voltage supply has two leads which are connected, respectively, to meter 40 through its terminal leads 41 and 42, respectively. The lead connected to terminal lead 41 contains rectifier 45, permitting flow of current only in the direction from the reference voltage source to the meter. The lead connected to terminal lead 42 contains a rectifier 46 which permits current to flow only from the meter 40 to the reference voltage source 38. Thus, it will be seen that if current is flowing from terminal 39 to reference voltage source 38, it will flow through rectifier 43, terminal lead 41, meter 40, terminal lead 42 and rectifier 46. On the other hand, if current flows from reference voltage source 38, it will flow through rectifier 45, terminal lead 41, ammeter 40, terminal lead 42 and rectifier 44. Thus, it will be observed that in both cases, whether power is being delivered or absorbed by the dynamometer, current flows through the meter in the same direction and, therefore, a unidirectional meter rather than a zero center reading meter can be used. In order to adjust the characteristic until it is such a continuous straight line as shown in FIG. 4, a resistance 48 is inserted in one of the branches. An adjustable resistance is preferably employed so that it can be adjusted until the characteristic is truly a straight line.

Either part of the characteristic could be realigned with the other part of the characteristic by proper location of the compensating element but in the circuit of FIG. 5 the resistance 48 acts to readjust the power absorbed portion of the characteristic and by its adjustment the uniformly linear characteristic indicated by the dashed line can be obtained. It will be observed that the same end could be attained by placing the resistance in series with the rectifier 44 as well as in series with the rectifier 45. A resistance placed in series with either of the other rectifiers would have the effect of adjusting the position of the part of the characteristic in the power delivered region, and this could be accomplished equally as satisfactorily under most conditions. The effect of this adjustment, of course, is to provide that at a certain percentage deviation, either above or below full speed, the power reading will be the same.

Figure 6:
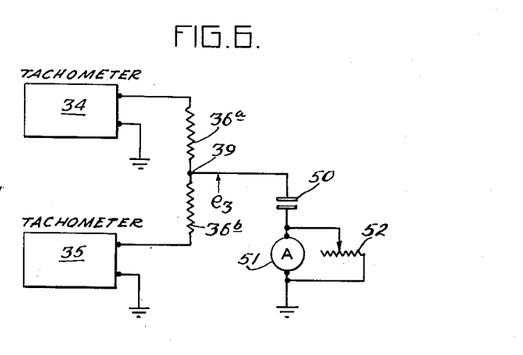
FIG. 6 is a schematic circuit diagram showing a circuit for recording amounts of acceleration or deceleration.

In order to have complete information on a device to be tested provision should be made for measuring acceleration and deceleration. Referring to FIG. 6, it will be observed that an acceleration-deceleration meter is shown. It will be observed that the tachometers 34, 35 are shown connected across a voltage divider 36a and 36b which can be the same as the one used with the power meter shown in FIG. 3, or a separate one. From the junction point 39, however, a different circuit is required. Connection is made serially from junction 39 through a capacitor 50 and a galvanometer 51 and the meter is, in turn, connected to ground, thereby providing a return path to the tachometers 34, 35. Bypassing the meter is a potentiometer 52 which permits adjustment in the calibration of meter 51. Meter 51 is preferably a zero center reading meter which is calibrated in terms of acceleration on one side of the zero mark and deceleration on the other side. It will be appreciated that as long as a steady speed is maintained, a constant voltage $e_3$ will be impressed across the plates of condenser 50 and the meter 51 will read zero. However, if the speed of the tachometers increases or decreases, the change in voltage will require a flow of charges to take place from one of the plates of the capacitor to the other. Thus, for example, if the speed increases, voltage $e_3$ will increase and the redistribution of charges on the plates of capacitor 50 will cause a flow of current through the meter 51 until a rebalanced condition is achieved. An opposite flow of current is involved for deceleration. Current will flow only during the transient period when charges are flowing to rebalance the unbalanced condition between the capacitor plates. It can be shown by a mathematical analysis that the rate of flow of current under these conditions is proportional to the rate of change of voltage with respect to time and this corresponds to an acceleration which is the rate of change of velocity with respect to time, the velocity being proportional to the voltage $e_3$. It will be observed that an element of acceleration is the weight of the vehicle or other device being tested and, accordingly, adjustment is provided through potentiometer 52 to compensate for different weights or masses of devices to be tested. For many applications, it is simply necessary to calibrate the potentiometer roughly into broad categories of automotive weights. However, the potentiometer can be calibrated in terms of weight or mass for more accurate readings.

Figure 7:
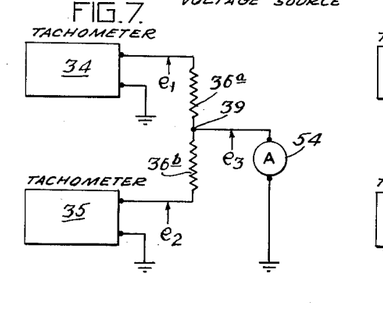
FIG. 7 is a diagram of a circuit for recording actual speed.

The circuit shown in FIG. 7 records the mean speed of the dynamometer. This circuit is effectively a modification of a conventional tachometer circuit used to measure speed. In this case, the tachometers 34 and 35 are again connected through voltage dividing resistances 36a and 36b to produce a mean voltage $e_3$ at junction point 39. This voltage, or the current which it produces through the ground back to the tachometers, may be recorded in galvanometer 54 which is connected between terminal 39 and ground to register the mean speed of the two shafts.

Figure 8:
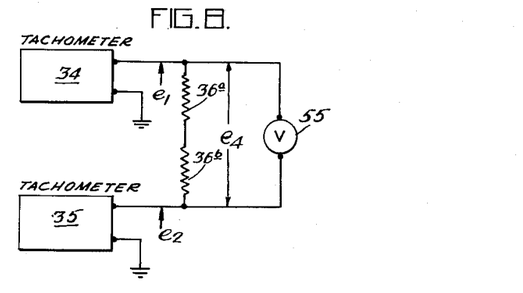
FIG. 8 is a diagram of a circuit for determining unbalance between the two drive means.

In testing automotive vehicles in particular, and other devices in which power is delivered through more than one shaft, it may be desirable to know whether the shafts are operating at the same speed at all times. If the tachometers 34 and 35 produce equal voltages $e_1$ and $e_2$, it is known that the speeds are the same. However, if $e_1$ and $e_2$ differ from one another, the speeds of the shafts differ. A resistance, which may be 36a and 36b, connected between the tachometers produce a difference voltage $e_4$ which may be recorded on voltmeter 55. This voltmeter is preferably a center reading voltmeter and may be calibrated so that if $e_1$ is higher voltages $e_4$ will be recorded in one direction and if $e_2$ is higher, meter deflection will be in the other direction. The amount of deflection in either event will be proportional to the voltage difference $e_4$ and the meter can be calibrated in terms of difference of speed or in percentage difference or any other desired means of calibration.

Several meter circuits have been described each of which is intended to give different information about the device being tested. In most cases, each of the circuits of FIGS. 5-8 will be employed, although under certain circumstances not all of them need to be employed. Heretofore only speed has been measured from the shaft speed. The circuits of FIGS. 3 and 5 are entirely new and relate to a concept which has not been recognized heretofore in the art. The use of tachometers to obtain all information rather than just information about speed would appear to be entirely new in the dynamometer art.

It will be appreciated by those skilled in the art that, in addition to the use of electrical tachometers, it is possible to use mechanical speed indicators, such as flyball indicators, etc. One modification of the speed indicator might be a mechanical tachometer which produces a meter reading through a lever arm, the lever arm being biased by a spring which may be adjusted in a way corresponding to adjustment of the reference voltage until zero reading is obtained.

Perhaps the widest application of the present invention will occur in the chassis dynamometer or automotive dynamometer field. For an understanding of the status of the art in this field, reference is made to the invention of Otis F. Presbrey described in U.S. Patent No. 2,130,900. Many of the structural features of automotive or chassis dynamometers of the present invention are improvements on Presbrey even without consideration of their advantage in connection with the new dynamometer. For example, the structure shown in FIGS. 9-12 are much simpler than the structure shown in the Presbrey patent, and hence easier and less expensive to manufacture.

The Presbrey device conceived of the testing apparatus as an automobile drive inverted or reversed, i.e., the rollers or drums of the Presbrey structure were intended to drive a dynamometer through a differential gearing system, or the dynamometer was intended to drive the rollers through the same gear system, much in the same way that the engine of the motor vehicle drives the rear wheels. Although, theoretically its basic concept has been an excellent one and has enabled testing of automobiles to accuracy not possible by any other means it has been cumbersome in some respects and has lacked the versatility of test equipment in other fields.

The problem has been to supply drive from the dynamometer through a differential system to the driven rollers or drums, or vice versa. An automobile, and hence this drive, requires differentials of different capacities for vehicles of different size and weight. This is so because the tubular drive shaft housings from the differential have been designed to support the rollers, just as such housings support the wheels of an automobile. Therefore, if the device is to be changed from the testing of light cars to the testing of heavy trucks, it is necessary to remove the differential and the wheel supports and supply heavier differential and wheel support equipment. On the other hand heavy equipment could not be used with light vehicles because of the added inertial effects. It may be necessary in passing from the lightest vehicles to the heaviest vehicles to be tested, or vice verso, to go through several changes of this sort in the differential in order to assure proper load bearing capacity. By contrast the structure of the present invention employs only one differential and yet is capable of testing vehicles of any size or weight on the same apparatus. The compensation problems involved with this system will be appreciated in light of the above description, and it will accordingly be understood how the interchange of differentials made accuracy of power readings from the dynamometer quite speculative.

The apparatus of the present invention employs rollers which are supported in bearings supported on support structure at each end of the roller. Thus, solidly supported, there is no need for the differential housing to support the bearing structure and the different drive shaft enclosing portions can be eliminated. Since, the bearings of the drive shaft at each side of the roller accept the weight, if made sufficiently heavy, only one transmission of medium weight, for example, may be used to accept all loads however heavy or light. With the drive shafts exposed it is also possible to employ tachometers directly on the shaft instead of employing diverse and complicated mechanisms in order to obtain individual drum speed readings. Moreover, compactness of the structure is not destroyed by the arrangement and, in fact, the drums may be widened in order to accept vehicles of a variety of axle lengths.

The structure described has material advantages wholly concerned to its use as a dynamometer of the present invention. These advantages stem from the fact that it is not weight sensitive, that is, vehicles of any weight can be placed on the dynamometer without increasing the inherent frictional resistance of the dynamometer. In the prior art as exemplified by Presbrey, however, since the rollers supporting wheels were not supported at each end of the axle, the load was transmitted to the differential through cantilever action or leverage and the frictional resistance tended to increase with increases in weight. This factor was the same one which made it necessary to employ separate differentials for different ranges of loads. Even after the time consuming task of replacement of the differential, however, an accurate reading of the power could not be assured. With the present invention using only one differential, there is essentially no inaccuracy introduced through different load weights.

Chassis dynamometers according to the present invention can be constructed in a variety of ways. They can be constructed on a raised platform off of the ground or built to keep the vehicle being tested at ground level by placing the apparatus in a pit. This latter type of apparatus is the type considered in the drawings although it will be understood by those skilled in the art that either type could be constructed using the basic principles illustrated.

Figure 9:
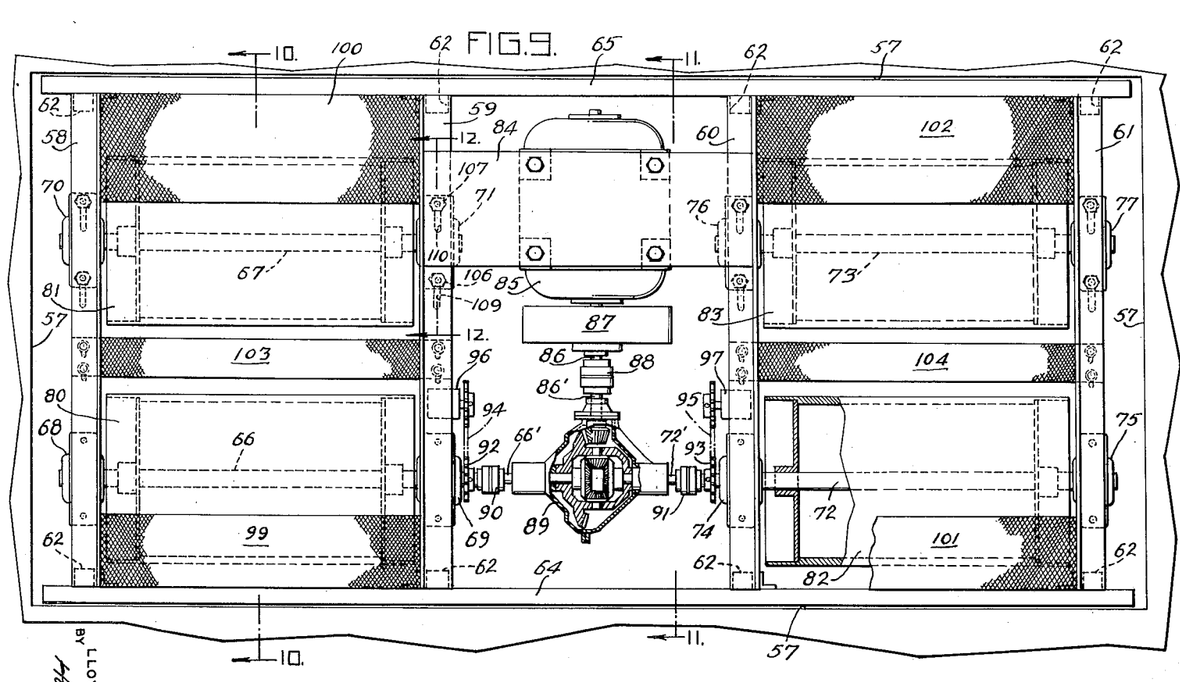
FIG. 9 is a plan view from above of the preferred form of apparatus for automotive testing in accordance with the present invention.
Figure 10:
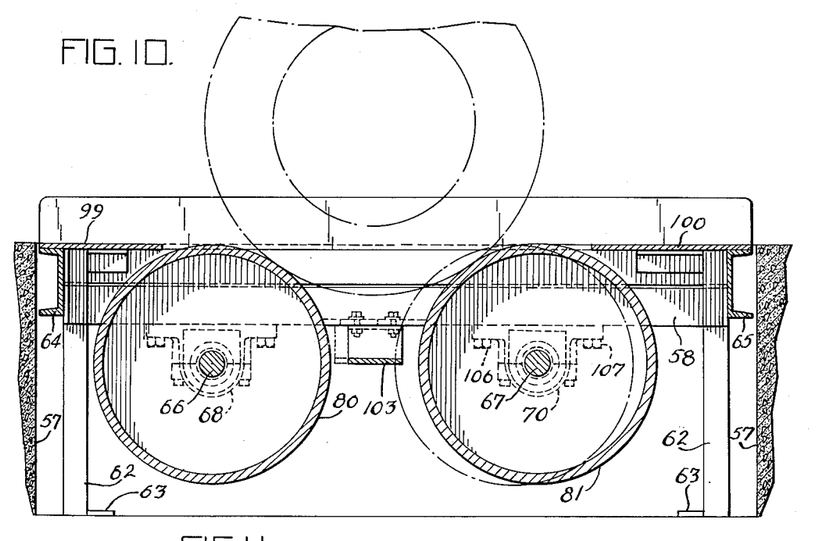
FIG. 10 is a sectional elevational view taken along line 10—10 of FIG. 9.
Figure 11:
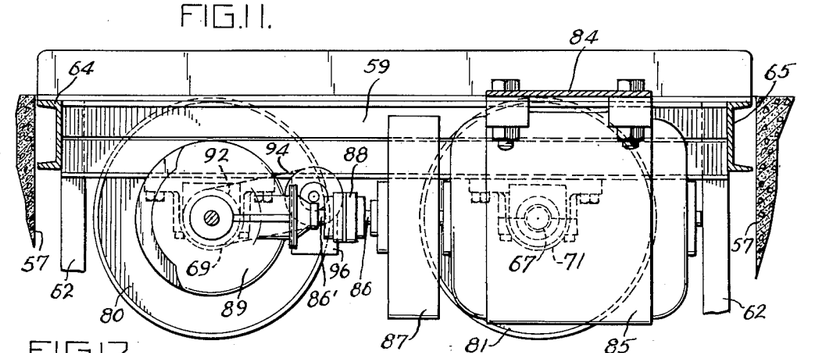
FIG. 11 is a sectional view taken along line 11—11 of FIG. 9.

As seen in FIGS. 9 and 10, the pit is preferably of rectangular shape and has concrete side walls 57. Extending laterally across the short dimension of the pit are four parallel beams 58, 59, 60 and 61. Each of these beams is supported on similar legs 62 at their opposite ends, each leg being provided with a foot plate 63. The ends of the beams 58, 59, 60 and 61 are joined together by parallel beams 64 and 65. Between beams 58 and 59 extend shafts 66 and 67 which are supported on the beams 58 and 59 by bearing members 68 and 69 and 70 and 71, respectively. These bearings may be bolted or otherwise supported on the frame members. In similar fashion extending between beams 60 and 61 are shafts 72 and 73 which are supported in bearings 74 and 75 and 76 and 77, respectively.

Supported on and coaxially fixed to shaft 66 is driven roller 80. Similarly coaxially fixed to and supported on shaft 67 is idler roller 81. Driven roller or drum 82 is coaxially fixed to shaft 72 and idler 83 is coaxially fixed to shaft 73. Extending between beams 59 and 60 is a support plate 84 to which a squirrel cage induction motor 85 serving as the test load device of the dynamometer is bolted or otherwise fastened with its shaft arranged generally horizontal. On the dynamometer shaft 86 is a flywheel 87, and this shaft is, in turn, coupled to shaft 86' through coupler 88. Shaft 86' is the dynamometer input shaft into the differential 89. Similarly, the drive shafts 66 and 72 are coupled to the differential through shafts 66' and 72', respectively through coupling means 90 and 91, respectively.

Also on the shafts 66 and 72 are sprocket wheels 92 and 93, respectively. These wheels through chain drives 94 and 95 drive tachometer generators 96 and 97, respectively. Tachometer generators 96 and 97 are mechanically supported directly on the beam members 59 and 60, respectively, and hence, provide a simple, uncomplicated structure.

As can best be seen in FIG. 10, the rollers 80 and 81 (as well as rollers 82 and 83, not seen) are preferably arranged tangent to ground level above the pit and extend from the side walls of the pit. Over beams 64 and 65 and across beams 58 and 59 are plates 99 and 100 which provide access for one wheel of the vehicle to be tested to the rollers 80 and 81. Similar plates 101 and 102 extend between beams 60 and 61 and provide access of the other wheel of the vehicle to rollers 82 and 83. In each case these plates lie approximately tangent to the rollers so that easy access to and egress from the region between the rollers is possible. Lower plates 103 and 104 between the rollers are included primarily for safety sake and do not serve as support for the vehicle as do plates 99, 100, 101 and 102. They extend between and beneath beams 58 and 59 and 60 and 61, respectively, so that they do not interfere with wheels placed on the rollers.

It will be seen that by arranging the bearings beneath the beams and placing the plates on top of the beams a very satisfactory geometry can be achieved using but relatively few rugged parts if all dimensions are properly chosen. By the same token, placing the plate 84 across the tops of beams 59 and 60 permits suspension of the dynamometer so that its drive shaft is aproximately at the level of shafts 66 and 72, thus facilitating coupling among the three shafts into the differential 89.

Figure 12:
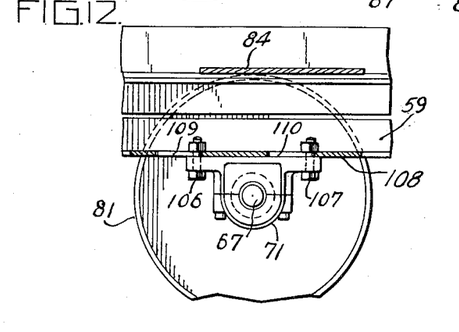
FIG. 12 is a detailed view taken along line 12—12 of FIG. 9.

In addition to the features of versatility previously mentioned it is possible to adjust the spacing between the rollers 80 and 81 or 82 and 83 by moving the bearings of the idler rollers relative to their supporting beams. For example, as shown in FIG. 12, the bearing 71 is provided with nuts and bolts 106 and 107 through flange 108 of beam 59. The bolts 106 and 107 lie in slots 109 and 110 which extend in the direction of the desired movement to permit wider separation or narrower separation of the drums of the rollers 81 and 80. Similarly, the position of roller 83 can be adjusted relative to roller 82. In the position shown the idler roller 81 is spaced a maximum distance from drive roller 80. By using longer slots a wider range of roller separation can be employed. To accommodate movement of the rollers, plates 103 and 104 may also be made adjustable in the same way. Moreover, greater ease in adjustment can be achieved by using rack and pinions with worm and gear movements, etc., to facilitate adjustments.

In the use of the structure shown in FIGS. 9–12, an automotive vehicle to be tested is moved onto the test device with its front or back wheels as desired in position between the rollers. Testing can then proceed using the dynamometer alternatively to deliver and absorb power to drive the wheels and the vehicle without the engine and then with the engine, respectively. The tests which can be performed are well known to those skilled in the art and described in writings such as the above mentioned Presbrey patent and preferably the tachometers are provided with the meter circuits herein described so that a variety of information can be obtained.

Although only one embodiment has been described, modifications and variations in structure will occur to those skilled in the art. All such variations and modifications within the scope of the claims are intended to be within the scope and spirit of the invention.

I claim:

1. A dynamometer comprising a test load device of known power and torque qualities for various speeds, means for coupling the test load device to a device to be tested, a speed indicator adapted to measure dynamometer speed calibrated directly in terms of the known power of the test load device at various speeds and an adjustable reference means opposing the speed indicator adjustable to cause the speed indicator to balance out mechanical frictional effects and read zero under no load conditions.

2. The power and torque testing device of claim 1 in which the test load device is a power absorbing hydraulic load.

3. The power and torque testing device of claim 1 in which the test load device is an eddy current power absorbing loading device.

4. The power and torque testing device of claim 1 in which the test loading device is a squirrel cage induction motor capable of both power absorbing and generating.

5. The power and torque testing device of claim 1 in which the test loading device is a motor generator set capable of power absorbing and generating.

6. A dynamometer comprising a test load device of known power and torque qualities for various speeds, means including a shaft for coupling the test load device to a device to be tested, a tachometer generator, an indicating meter connected to the generator and calibrated directly in terms of the known power of the test load device at various speeds, said tachometer being coupled to the shaft for producting a voltage proportional to the shaft speed and a reference voltage source adjustable to balance out voltage of the tachometer under no load conditions.

7. The dynamometer of claim 6 in which the tachometer meter indicating power is arranged in a circuit whereby current flowing one way between the tachometer and reference voltage source passes through a compensating impedance whereas current flowing in the other direction through the meter bypasses the impedance in order to effectively obtain a continuous straight line power versus speed curve.

8. The dynamometer of claim 7 in which the impedance through circuits flowing only in one direction pass is variable.

9. The dynamometer of claim 7 in which the terminals of the tachometer and reference voltage source between which the meter is connected are arranged so that each of them is connected to two leads, each pair having one lead connected to opposite sides of the meter, rectifiers being provided in each lead such that current can only flow through the meter in one direction by one of two paths depending upon the direction of the current between the tachometer and the reference voltage source and the impedance is located in one of the branches connected to one of the terminals.

10. A dynamometer testing device for automotive vehicles comprising a wheel supporting roller, a dynamometer test load of known speed-power characteristics, load coupling means including a shaft for coupling the roller to the test load, a speed indicator calibrated in terms of power of the load device for the particular speed indicated coupled to the shaft and an adjustable reference device for producing a fixed amount of force of the type produced by the speed indicator to balance out speed indicator readings under no load conditions to indicate zero power.

11. A dynamometer testing device for automotive vehicles comprising a wheel supporting roller, a dynamometer test load of known speed-power characteristics, load coupling means including a shaft for coupling the roller to the test load, a tachometer generator coupled to the shaft for producing a voltage proportional to the shaft speed, an indicator calibrated in terms of power of the load device for the particular speed indicated and a reference voltage source adjustable to balance out the voltage of the tachometer under no load conditions so that the indicator reads zero power at no load.

12. A dynamometer testing device for automotive vehicles comprising two pairs of wheel supporting rollers, a dynamometer test load of known power-speed characteristics, a differential gear system coupling together one roller of each pair and the dynamometer test load, each of the rollers and the test load having a separate shaft into the differential system, speed indicators on each of the shafts connecting the differential and the rollers, said indicators being calibrated in terms of the power of the test load for the particular speed indicated and an adjustable reference device for producing a fixed amount of force of the type produced by each speed indicator and coupled to each indicator to produce an algebraic sum adjustable to produce a zero power reading under no load conditions.

13. The dynamometer testing device of claim 12 in which four rollers having parallel axles which extend axially through the rollers are arranged in pairs each pair of which supports a wheel of the vehicle being tested on and between the rollers so that one roller of each pair has a drive shaft extending toward a corresponding drive shaft from the other pair and coupling it to the differential, support frame members are arranged at each end of the roller, bearings are provided for supporting the drive shaft on the support frame members at each end of the roller and the dynamometer test load and the differential system are supported on the frame members.

14. A dynamometer testing device for automotive vehicles comprising two pairs of wheel supporting rollers, a dynamometer test load of known power-speed characteristics, a differential gear system coupling together one roller of each pair and the dynamometer test load, each of the rollers and the test load having a separate shaft into the differential system, tachometer generators on each of the shafts connecting the differential and the rollers, a meter connected to the tachometer generators calibrated in terms of power of the test load for the particular speed indicated and a reference voltage source coupled to the tachometer and adjustable to balance out the voltage of the tachometer so that the meter reads zero under no load conditions.

15. A dynamometer testing device for automotive vehicles comprising two pairs of wheel supporting rollers each pair arranged to rotate about parallel axes and to support a wheel of a vehicle being tested on and between the rollers, aligned drive shafts fixed to one roller of each pair, each drive shaft extending axially through its respective roller, support frame members at each end of the roller, bearings supporting the drive shaft on the support frame members at each end of the roller, a dynamometer test load of known speed power characteristics, load coupling means including a differential gear system coupled to and coupling together the drive shafts and the dynamometer test load, the differential housing terminating along the drive shafts short of the frame, a speed indicator calibrated in terms of power of the load device for the particular speed indicated coupled to at least one of the drive shafts, and an adjustable reference device for producing a fixed amount of force of the type produced by the speed indicator to balance out the speed indicator readings under no-load conditions to indicate zero power.

16. The device of claim 15 in which the shafts fixed to the rollers extend axially through each of the rollers, bearings are provided for each shaft at each end of the rollers and the supporting frame includes four parallel members arranged generally perpendicular to the roller axles and placed so that each supports the bearings at the corresponding end of the rollers of one pair.

17. The device of claim 16 in which the four support members have their bearings supporting surfaces in a plane and the dynamometer test device is supported on a cross member extending between the inner support frame members.

18. A dynamometer testing device for automotive vehicles comprising two pairs of wheel supporting rollers, each pair including a drive roller and an idler roller arranged to rotate about parallel axes and to support a wheel of a vehicle being tested on and between them, aligned drive shafts each fixed to the drive roller of each roller pair and extending axially through its respective roller and toward the other drive shaft, similar shafts extending through and fixed to the idler rollers, a support frame including parallel members having bearing support surfaces adjacent to the ends of each pair of rollers in essentially the same plane, bearings supporting each shaft on the support surfaces of each of the frame members adjacent its roller, the bearings supporting the idler roller shafts being movable relative to the support frame to change the spacing between each pair of rollers to accommodate vehicles having wheels of different sizes, a cross frame member between the inner parallel support frame members between the idler rollers, a dynamometer test load of known speed-power characteristics supported on the cross frame member, a differential gear system coupled to and coupling together the drive shafts and the dynamometer, the differential housing terminating along the drive shafts short of the frame and tachometers coupled to each of the drive shafts and supported on the inner frame support members calibrated in terms of the load device for the particular speed indicated, a reference voltage source coupled to the tachometers and adjustable to balance out the voltages of each of the tachometers, and a meter in circuit with each of the tachometers and reference voltage source, the circuit being adjusted so that the meter reads zero under no-load conditions.

19. A dynamometer comprising a test load device of known power and torque qualities for various speeds, means for coupling the test load device to a device to be tested, a speed measuring device adapted to provide a first effect related to the speed of the dynamometer and means producing a second effect of a constant size representative of system losses in the dynamometer and opposed in sense to said first effect and indicator means which combines said first and second effects and is calibrated in terms of the known speed-power qualities of the test load device whereby an indication of the power of the device to be tested is obtained.

References Cited in the file of this patent

UNITED STATES PATENTS

| | | |
|---|---|---|
| 2,054,076 | Folsom | Sept. 15, 1936 |
| 2,130,833 | Bennett | Sept. 20, 1938 |
| 2,130,900 | Presbrey | Sept. 20, 1938 |
| 2,298,894 | McDougal | Oct. 13, 1942 |
| 2,520,696 | Smith | Aug. 29, 1950 |
| 2,585,478 | Lee et al. | Feb. 12, 1952 |
| 2,653,472 | Gibson | Sept. 29, 1953 |
| 2,758,830 | Bentley | Aug. 14, 1956 |
| 2,771,773 | Wallace | Nov. 27, 1956 |
| 2,775,119 | Kirby | Dec. 25, 1956 |
| 2,785,367 | Roman et al. | Mar. 12, 1957 |
| 2,940,309 | Karlby | June 14, 1960 |

FOREIGN PATENTS

| | | |
|---|---|---|
| 273,742 | Great Britain | Nov. 3, 1927 |